United States Patent
Fukutomi

(10) Patent No.: US 11,827,272 B2
(45) Date of Patent: Nov. 28, 2023

(54) LANE DEPARTURE PREVENTION DEVICE

(71) Applicant: TOYOTA JIDOSHA KABUSHIKI KAISHA, Toyota (JP)

(72) Inventor: Daisuke Fukutomi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 17/531,233

(22) Filed: Nov. 19, 2021

(65) Prior Publication Data

US 2022/0204082 A1 Jun. 30, 2022

(30) Foreign Application Priority Data

Dec. 25, 2020 (JP) ................. 2020-217660

(51) Int. Cl.
*B62D 15/02* (2006.01)
*B62D 6/00* (2006.01)

(52) U.S. Cl.
CPC ............ *B62D 15/0265* (2013.01); *B62D 6/00* (2013.01)

(58) Field of Classification Search
CPC .... B62D 15/0265; B62D 6/00; B62D 15/025; B60W 30/12; B60W 50/14; B60W 2050/143
See application file for complete search history.

(56) References Cited

U.S. PATENT DOCUMENTS

| | | | |
|---|---|---|---|
| 2003/0097206 A1* | 5/2003 | Matsumoto | B62D 15/025 701/1 |
| 2004/0262063 A1* | 12/2004 | Kaufmann | B62D 15/025 180/169 |
| 2007/0233343 A1* | 10/2007 | Saito | B62D 15/025 701/41 |
| 2009/0216404 A1* | 8/2009 | Maass | B62D 15/025 701/41 |

(Continued)

FOREIGN PATENT DOCUMENTS

| | | | | |
|---|---|---|---|---|
| DE | 102006027325 A1 * | 12/2007 | ............ | B60W 30/12 |
| DE | 102009041187 A1 * | 2/2011 | ............ | B60W 30/12 |
| JP | 09-142327 A | 6/1997 | | |

OTHER PUBLICATIONS

DE-102009041187-A1 translation (Year: 2011).*

(Continued)

*Primary Examiner* — Jeff A Burke
*Assistant Examiner* — Kyle T Johnson
(74) *Attorney, Agent, or Firm* — Sughrue Mion, PLLC

(57) ABSTRACT

Provided is a lane departure prevention device that, when a risk that a vehicle departs from a lane is determined, issues a warning, steers a steering wheel, and prevent the departure. An electronic control unit is configured to, when a determination is made that the vehicle travels obliquely to the lane based on a position of the vehicle detected by a CCD camera and a determination is made that steering torque detected by a torque sensor is equal to or greater than a reference steering torque, start prohibition of issuing of the warning (Continued)

and prohibition of steering of the steering wheel, and in a situation where issuing of the warning and steering of the steering wheel are prohibited, when a determination is made that the vehicle terminates traveling obliquely to the lane, release the prohibition of issuing of the warning and the prohibition of steering of the steering wheel.

11 Claims, 9 Drawing Sheets

(56) References Cited

U.S. PATENT DOCUMENTS

| 2015/0149039 | A1* | 5/2015 | Fu | B62D 15/025 |
| | | | | 701/41 |
| 2015/0344029 | A1* | 12/2015 | Silvlin | B62D 15/025 |
| | | | | 701/36 |
| 2016/0107687 | A1* | 4/2016 | Yamaoka | B62D 15/025 |
| | | | | 701/41 |
| 2017/0148327 | A1* | 5/2017 | Sim | G08G 1/167 |
| 2017/0225711 | A1* | 8/2017 | DeCia | B60W 50/085 |
| 2018/0201318 | A1* | 7/2018 | Kataoka | G06V 20/588 |
| 2019/0227546 | A1* | 7/2019 | Sato | B60W 30/18163 |
| 2020/0207348 | A1* | 7/2020 | Sato | B60W 30/16 |
| 2020/0307582 | A1* | 10/2020 | Sato | B60W 50/10 |
| 2022/0204082 | A1* | 6/2022 | Fukutomi | B62D 6/00 |
| 2022/0363252 | A1* | 11/2022 | Itazuri | G06V 20/588 |

OTHER PUBLICATIONS

DE-102006027325-A1 translation (Year: 2007).*
Multi-Level Cooperation between the driver and an automated driving system during lane change (Year: 2016).*

* cited by examiner

LANE DEPARTURE PREVENTION DEVICE

CROSS-REFERENCE TO RELATED APPLICATION

This application claims priority to Japanese Patent Application No. 2020-217660 filed on Dec. 25, 2020, incorporated herein by reference in its entirety.

BACKGROUND

1. Technical Field

The present disclosure relates to a lane departure prevention device for a vehicle, such as an automobile.

2. Description of Related Art

A lane departure prevention control of, when there is a risk that a vehicle, such as an automobile, departs from a lane, automatically steering a steering wheel to prevent the vehicle from departing from the lane is known. Even when the lane departure prevention control is performed, steering of the steering wheel by the lane departure prevention control is needed to be regulated in a situation where a driver drives the vehicle to depart from the lane by a steering operation based on his/her own intention, such as a lane change.

For example, Japanese Unexamined Patent Application Publication No. 09-142327 (JP 09-142327 A) discloses a lane departure prevention device that, when a risk that a vehicle departs from a lane is detected, automatically steers a steering wheel and operates a warning device and issues a warning. In the lane departure prevention device, in order to prevent a lane departure prevention control from interfering with a steering operation based on the intention of a driver, even in a case where the risk that the vehicle departs from the lane is detected, when a sudden steering operation by the driver is detected, steering of the steering wheel or the warning by the lane departure prevention control is regulated.

SUMMARY

In a situation where there is a risk that a driver causes a vehicle to depart from a lane based on his/her own intention, in order to prevent the driver from feeling anxiety due to a warning, it is preferable to determine whether or not the driver intends to cause the vehicle to depart from the lane and to regulate steering a steering wheel or the warning before the risk that the vehicle departs from the lane is detected.

In the lane departure prevention device in the related art disclosed in JP 09-142327 A, when the risk that the vehicle departs from the lane is detected, steering of the steering wheel by the lane departure prevention control is performed, and the warning is issued. Therefore, in the situation where the risk that the vehicle departs from the lane is detected, in a case where the sudden steering operation based on the intention of the driver is detected, steering of the steering wheel by the lane departure prevention control and the regulation of the warning is performed. Therefore, in the lane departure prevention device in the related art, it is not possible to determine whether or not the driver intends to cause the vehicle to depart from the lane and to regulate steering of the steering wheel or the warning before the risk that the vehicle departs from the lane is detected, and it is not possible to prevent the driver from feeling anxiety due to the warning.

A main problem of the present disclosure is to, by determining whether or not the driver intends to cause the vehicle to depart from the lane and prohibiting issuing of the warning or steering of the steering wheel before a risk that the vehicle departs from the lane is detected, prevent the driver from feeling anxiety due to the warning, in a case where the driver causes the vehicle to depart from the lane based on his/her own intention.

A first aspect of the present disclosure provides a lane departure prevention device including a vehicle position detection device, a warning device, a steering device, and a control unit. The vehicle position detection device is configured to detect a position of a vehicle with respect to a lane. The steering device is configured to steer a steering wheel. The control unit is configured to control the warning device and the steering device. The control unit is configured to, when a determination is made that there is a risk that the vehicle departs from the lane based on the position of the vehicle detected by the vehicle position detection device, perform at least one of issuing a warning by the warning device and steering of the steering wheel, for preventing the vehicle from departing from the lane.

The lane departure prevention device further includes a steering torque detection device configured to detect a steering torque. The control unit is configured to, when a determination is made that the vehicle travels obliquely to the lane based on the position of the vehicle detected by the vehicle position detection device and a determination is made that the steering torque detected by the steering torque detection device is equal to or greater than a reference steering torque, start prohibition of issuing of the warning and prohibition of steering of the steering wheel.

In a case where the driver causes the vehicle to depart from the lane based on his/her own intention, such as a lane change, before the risk that the vehicle departs from the lane occurs, the vehicle starts traveling obliquely to the lane, and the steering torque is increased. Therefore, the determination is made as to whether or not the vehicle travels obliquely to the lane and the determination is made as to whether or not the steering torque is large, so that a determination can be made as to whether or not the driver intends to cause the vehicle to depart from the lane based on his/her own intention.

With the configuration described above, when the determination is made that the vehicle travels obliquely to the lane and the determination is made that the steering torque is equal to or greater than the reference steering torque, the prohibition of issuing of the warning and the prohibition of steering of the steering wheel are started. Therefore, before the risk that the vehicle departs from the lane occurs, the determination can be made as to whether or not the driver intends to cause the vehicle to depart from the lane based on his/her own intention. Therefore, the determination can be made as to whether or not the driver intends to cause the vehicle to depart from the lane and issuing of the warning and steering of the steering wheel can be prohibited before the risk that the vehicle departs from the lane is detected, so that the driver can be prevented from feeling anxiety due to the warning and steering of the steering wheel, in a case where the driver causes the vehicle to depart from the lane based on his/her own intention.

In addition, in a case where the vehicle departs from the lane due to the driver's carelessness, the steering torque does not become a large value even when the vehicle travels obliquely to the lane. Therefore, even when the determination is made that the vehicle travels obliquely to the lane, the determination is not made that the steering torque is equal to or greater than the reference steering torque, so that the prohibition of issuing of the warning and the prohibition of steering of the steering wheel are not started. Therefore, since it is possible to issue the warning or steer the steering wheel, it is possible to alert the driver or prevent the vehicle from departing from the lane due to steering of the steering wheel.

As described above, in the lane departure prevention device in the related art disclosed in JP 09-142327 A, even in a case where the risk that the vehicle departs from the lane is detected, when a sudden steering operation by the driver is detected, the warning is regulated. Therefore, depending on setting of a threshold value for detecting the sudden steering operation, the sudden steering operation is detected even in a case where the vehicle travels on a curve, so that in a situation where the vehicle travels on the curve, even when the risk that the vehicle departs from the lane occurs, it is not possible to alert the driver by the warning and to perform steering of the steering wheel for lane departure prevention.

With the configuration described above, when the determination is made that the vehicle travels obliquely to the lane and the determination is made that the steering torque is equal to or greater than the reference steering torque, the prohibition of issuing of the warning and the prohibition of steering of the steering wheel are started. Therefore, in a case where the vehicle departs from the lane to an outside of the curve when the vehicle travels on the curve, the determination is not made that the steering torque is equal to or greater than the reference steering torque, so that the prohibition of issuing of the warning and the prohibition of steering of the steering wheel are not started. Therefore, it is possible to issue the warning to alert the driver that there is the risk that the vehicle departs from the lane or to perform steering of the steering wheel for the lane departure prevention.

In a second aspect of the present disclosure, the control unit may be configured to, in a situation where issuing of the warning and steering of the steering wheel are prohibited, when a determination is made that the vehicle terminates traveling obliquely to the lane based on the position of the vehicle detected by the vehicle position detection device (CCD camera 12), release the prohibition of issuing of the warning and the prohibition of steering of the steering wheel.

According to the aspect described above, in the situation where the issuing of the warning and steering of the steering wheel are prohibited, when the determination is made that the vehicle terminates traveling obliquely to the lane based on the position of the vehicle detected by the vehicle position detection device, the prohibition of issuing of the warning and the prohibition of steering of the steering wheel are released. Therefore, issuing of the warning can be prohibited, steering of the steering wheel is prevented from being unnecessarily continued, and when the risk that the vehicle departs from the lane occurs, issuing a needed warning and steering of the steering wheel can be performed.

In a third aspect of the present disclosure, the control unit may be configured to acquire information on a vehicle speed and variably set the reference steering torque to be smaller as the vehicle speed is higher, in response to the vehicle speed.

A steering resistance when the steering wheel is steered by the steering operation of the driver is smaller as the vehicle speed is higher. According to the aspect described above, the reference steering torque is variably set to be smaller as the vehicle speed is higher, in response to the vehicle speed. Therefore, the determination can be appropriately made as to whether or not the driver intends to change a traveling direction of the vehicle, regardless of the vehicle speed, as compared with a case where the reference steering torque is a constant.

In a fourth aspect of the present disclosure, the control unit may be configured to acquire information on a vehicle speed, estimate a movement speed of the vehicle in a direction perpendicular to the lane based on the position of the vehicle detected by the vehicle position detection device and the vehicle speed, and determine whether or not the vehicle travels obliquely to the lane based on at least one of the movement speed and a temporal change rate of the movement speed.

According to the aspect described above, the movement speed of the vehicle in the direction perpendicular to the lane is estimated based on the position and the vehicle speed of the vehicle, and the determination is made as to whether or not the vehicle travels obliquely to the lane based on at least one of the movement speed and the temporal change rate of the movement speed. Therefore, the determination can be easily and accurately made as to whether or not the vehicle travels obliquely to the lane as compared with a case where the determination is made as to whether or not the vehicle travels obliquely to the lane based on a change in image information in front of the vehicle acquired by, for example, a camera.

Further, in a fifth aspect of the present disclosure, the control unit may be configured to, when a linear sum of the movement speed and the temporal change rate of the movement speed is equal to or greater than an oblique-traveling start reference value, determine that the vehicle travels obliquely to the lane.

According to the aspect described above, when the linear sum of the movement speed and the temporal change rate of the movement speed is equal to or greater than the oblique-traveling start reference value, the determination is made that the vehicle travels obliquely to the lane. Therefore, the determination can be appropriately made as to whether or not the vehicle travels obliquely to the lane as compared with a case where the determination is made whether or not the vehicle travels obliquely to the lane based on one of the movement speed and the temporal change rate of the movement speed.

Further, in a sixth aspect of the present disclosure, the control unit may be configured to variably set the oblique-traveling start reference value to be greater as the vehicle speed is higher, in response to the vehicle speed.

Even when a degree of oblique-traveling of the vehicle is the same, the linear sum of the movement speed and the temporal change rate of the movement speed is greater as the vehicle speed is higher. According to the aspect described above, the oblique-traveling start reference value is variably set to be greater as the vehicle speed is higher, in response to the vehicle speed. Therefore, the determination can be appropriately made as to whether or not the vehicle travels obliquely to the lane, regardless of the vehicle speed, as compared with a case where the oblique-traveling start reference value is a constant.

Further, in a seventh aspect of the present disclosure, the control unit may be configured to, in a situation where issuing of the warning and steering of the steering wheel are prohibited, when the linear sum of the movement speed and the temporal change rate of the movement speed is equal to or smaller than an oblique-traveling termination reference value, determine that the vehicle terminates traveling obliquely to the lane.

According to the aspect described above, in the situation where issuing of the warning and steering of the steering wheel are prohibited, when the linear sum of the movement speed and the temporal change rate of the movement speed is equal to or smaller than the oblique-traveling termination reference value, the determination is made that the vehicle terminates traveling obliquely to the lane. Therefore, the determination can be appropriately made as to whether or not the vehicle terminates traveling obliquely to the lane as compared with a case where the determination is made whether or not the vehicle terminates traveling obliquely to the lane based on one of the movement speed and the temporal change rate of the movement speed.

Further, in an eighth aspect of the present disclosure, the control unit may be configured to variably set the oblique-traveling termination reference value to be greater as the vehicle speed is higher, in response to the vehicle speed.

As described above, even when the degree of oblique-traveling of the vehicle is the same, the linear sum of the movement speed and the temporal change rate of the movement speed is greater as the vehicle speed is higher. According to the aspect described above, the oblique-traveling termination reference value is variably set to be greater as the vehicle speed is higher, in response to the vehicle speed. Therefore, the determination can be appropriately made as to whether or not the vehicle terminates traveling obliquely to the lane, regardless of the vehicle speed, as compared with a case where the oblique-traveling termination reference value is a constant.

Further, in a ninth aspect of the present disclosure, the control unit may be configured to, in a situation where issuing of the warning and steering of the steering wheel are prohibited, when a determination is made that the vehicle travels along the lane within the lane based on the position of the vehicle detected by the vehicle position detection device, determine that the vehicle terminates traveling obliquely to the lane.

According to the aspect described above, in the situation where issuing of the warning and steering of the steering wheel are prohibited, when the determination is made that the vehicle travels along the lane within the lane, the determination is made that the vehicle terminates traveling obliquely to the lane. Therefore, for example, when the linear sum of the movement speed and the temporal change rate of the movement speed is equal to or smaller than the oblique-traveling termination reference value, timing at which the prohibition of issuing of the warning and the prohibition of steering of the steering wheel are released can be delayed as compared with a case where the determination is made that the vehicle terminates traveling obliquely to the lane.

Further, in a tenth aspect of the present disclosure, the lane departure prevention device may further include an obstacle detection device configured to detect an obstacle in front of the vehicle, and the control unit may be configured to, in a situation where issuing of the warning and steering of the steering wheel are prohibited, when the obstacle in front of the vehicle is detected by the obstacle detection device, not release the prohibition of issuing of the warning and the prohibition of steering of the steering wheel even when a determination is made that the vehicle terminates traveling obliquely to the lane based on the position of the vehicle detected by the vehicle position detection device.

According to the aspect described above, in the situation where issuing of the warning and steering of the steering wheel are prohibited, when the obstacle in front of the vehicle is detected, the prohibition of issuing of the warning and the prohibition of steering of the steering wheel are not released even when the determination is made that the vehicle terminates traveling obliquely to the lane. Therefore, when the driver causes the vehicle to travel while avoiding the obstacle in front of the vehicle based on his/her own intention, the prohibition of issuing of the warning and the prohibition of steering of the steering wheel are released, and the driver can be prevented from feeling anxiety due to the warning or steering of the steering wheel.

Further, in an eleventh aspect of the present disclosure, the control unit may be configured to, in a situation where issuing of the warning and steering of the steering wheel are prohibited, when the obstacle in front of the vehicle is detected by the obstacle detection device, not release the prohibition of issuing of the warning and the prohibition of steering of the steering wheel until time equal to or longer than reference time elapses after a determination is made that the vehicle terminates traveling obliquely to the lane based on the position of the vehicle detected by the vehicle position detection device.

According to the aspect described above, in the situation where issuing of the warning and steering of the steering wheel are prohibited, when the obstacle in front of the vehicle is detected, the prohibition of issuing of the warning and the prohibition of steering of the steering wheel are not released until the time equal to or longer than the reference time elapses after the determination is made that the vehicle terminates traveling obliquely to the lane. Therefore, in the situation where the vehicle travels while avoiding the obstacle, issuing of the warning and steering of the steering wheel can be surely prohibited until the time equal to or longer than the reference time elapses after the determination is made that the vehicle terminates traveling obliquely to the lane.

Further, in a twelfth aspect of the present disclosure, the control unit may be configured to acquire information on a vehicle speed and variably set the reference time to be shorter as the vehicle speed is higher, in response to the vehicle speed.

In a case where the vehicle travels while avoiding the obstacle, the vehicle travels obliquely to bypass the obstacle, travels along the lane, and then travels obliquely to be returned to the original lane. Time needed for the vehicle to be returned to the original lane after the vehicle terminates oblique-traveling and travels along the lane is shorter as the vehicle speed is higher.

According to the aspect described above, the reference time is variably set to be shorter as the vehicle speed is higher, in response to the vehicle speed. Therefore, the determination can be appropriately made as to whether or not prohibition of the lane departure prevention should be maintained, regardless of the vehicle speed, as compared with a case where the reference time is a constant.

Further, in a thirteenth aspect of the present disclosure, the control unit may be configured to, when a determination is made that the vehicle changes the lane based on the position of the vehicle detected by the vehicle position detection device, release the prohibition of issuing of the warning and the prohibition of steering of the steering wheel even when the time equal to or longer than the reference time does not elapse after the determination is made that the vehicle terminates traveling obliquely to the lane.

According to the aspect described above, when the determination is made that the vehicle changes the lane, the prohibition of issuing of the warning and the prohibition of steering of the steering wheel are released even when the time equal to or longer than the reference time elapse after the determination is made that the vehicle terminates traveling obliquely to the lane. Therefore, when the vehicle terminates traveling obliquely to the lane, as in a case where the vehicle changes the lane while avoiding the obstacle, the prohibition of issuing of the warning and the prohibition of steering of the steering wheel are released, and unnecessarily continuing the prohibition of issuing of the warning and the prohibition of steering of the steering wheel can be avoided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the accompanying drawings.

First Embodiment

Figure 1:
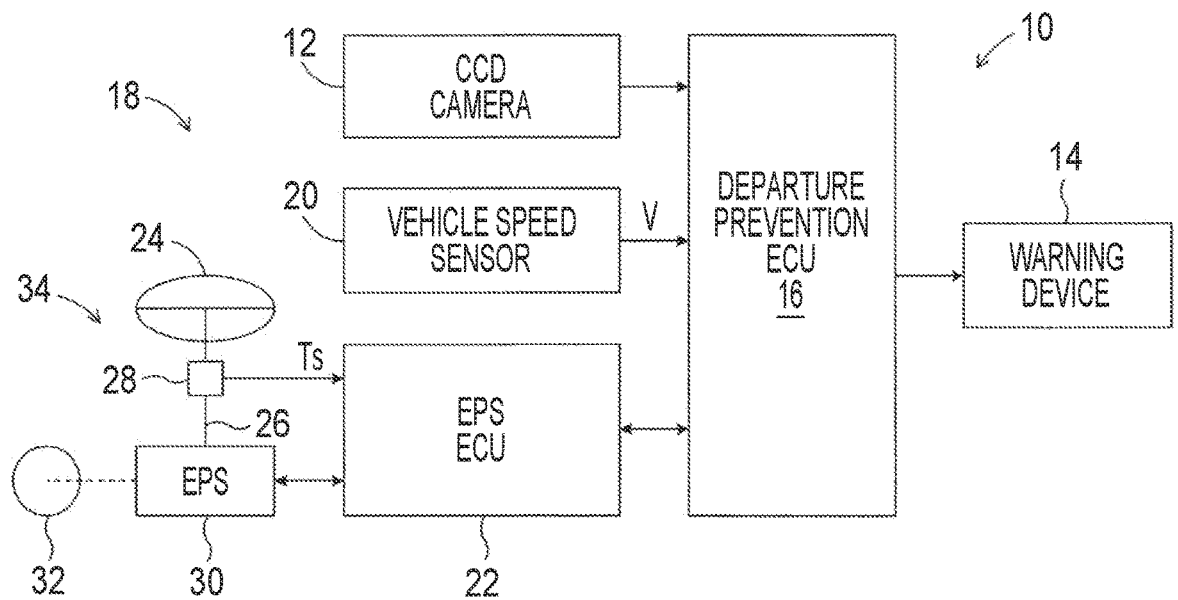
FIG. 1 is a schematic configuration diagram showing a lane departure prevention device according to an embodiment of the present disclosure.

As shown in FIG. 1, a lane departure prevention device 10 according to the embodiment includes a CCD camera 12, a warning device 14, and an electronic control unit for departure prevention (hereinafter, abbreviated as "departure prevention ECU") 16 as a control unit that controls the warning device and a steering device to be described below. The CCD camera 12 functions as an information acquisition device that is a part of a vehicle position detection device, and image information in front of a vehicle 18 acquired by the CCD camera 12 is input to the departure prevention ECU 16. In addition, a signal indicating a vehicle speed V is input from a vehicle speed sensor 20 to the departure prevention ECU 16, and a signal indicating a steering torque Ts is input from an electronic control unit for electric power steering (hereinafter abbreviated as "EPS ECU") 22.

In the shown embodiment, the information acquisition device is the CCD camera 12, but the information acquisition device may be another camera known in the technical field, such as a CMOS camera, as long as the camera can acquire image information in front of the vehicle 18. In addition, the warning device 14 may be any of a warning device that issues a visual warning, such as a warning lamp, a warning device that issues an auditory warning, such as a warning buzzer, and a warning device that issues a bodily warning, such as vibration of a seat, or may be any combination thereof.

As will be described in detail below, the departure prevention ECU 16 specifies a lane based on the image information in front of the vehicle 18 acquired by the CCD camera 12, and also specifies a positional relationship of the vehicle 18 with respect to the lane. Therefore, the CCD camera 12 and the departure prevention ECU 16 cooperate with each other to function as a vehicle position detection device that detects a position of the vehicle 18 with respect to the lane. Further, the departure prevention ECU 16 determines whether or not there is a risk that the vehicle 18 departs from the lane based on the specified positional relationship in a manner known in the technical field, and performs a lane departure prevention control of issuing of the warning by operating the warning device 14 when the determination is made that there is the risk of departure. The lane departure prevention control is also called a lane departure alert (LDA) control.

As shown in FIG. 1, a torque sensor 28 that detects the steering torque Ts is provided on a steering shaft 26 to which a steering wheel 24 operated by a driver is integrally connected. The signal indicating the steering torque Ts detected by the torque sensor 28 is input to the EPS ECU 22. The EPS ECU 22 controls a steering assist torque by controlling an electric power steering device (hereinafter abbreviated as "EPS") 30 in a manner known in the technical field based on the steering torque Ts and the vehicle speed V detected by the vehicle speed sensor 20.

The EPS ECU 22 can steer a steering wheel 32, as needed, by controlling the EPS 30. Therefore, the EPS ECU 22 and the EPS 30 constitute a steering device 34 that automatically steers the steering wheel 32, as needed. When the determination is made that there is the risk that the vehicle 18 departs from the lane, the lane departure prevention device 10 performs the lane departure prevention control by steering of the steering wheel. The lane departure prevention control by steering of the steering wheel 32 may be, for example, any lane keeping assist (LKA) control known in the technical field.

Note that although not shown in detail in FIG. 1, the departure prevention ECU 16 and the EPS ECU 22 each include a microcomputer and a drive circuit, and perform exchange of needed information with each other. Each microcomputer has a CPU, a ROM, a RAM, and an input/output port device, and has a general configuration in which the CPU, the ROM, the RAM, and the input/output port device are connected to each other by a bidirectional common bus.

Figure 2:
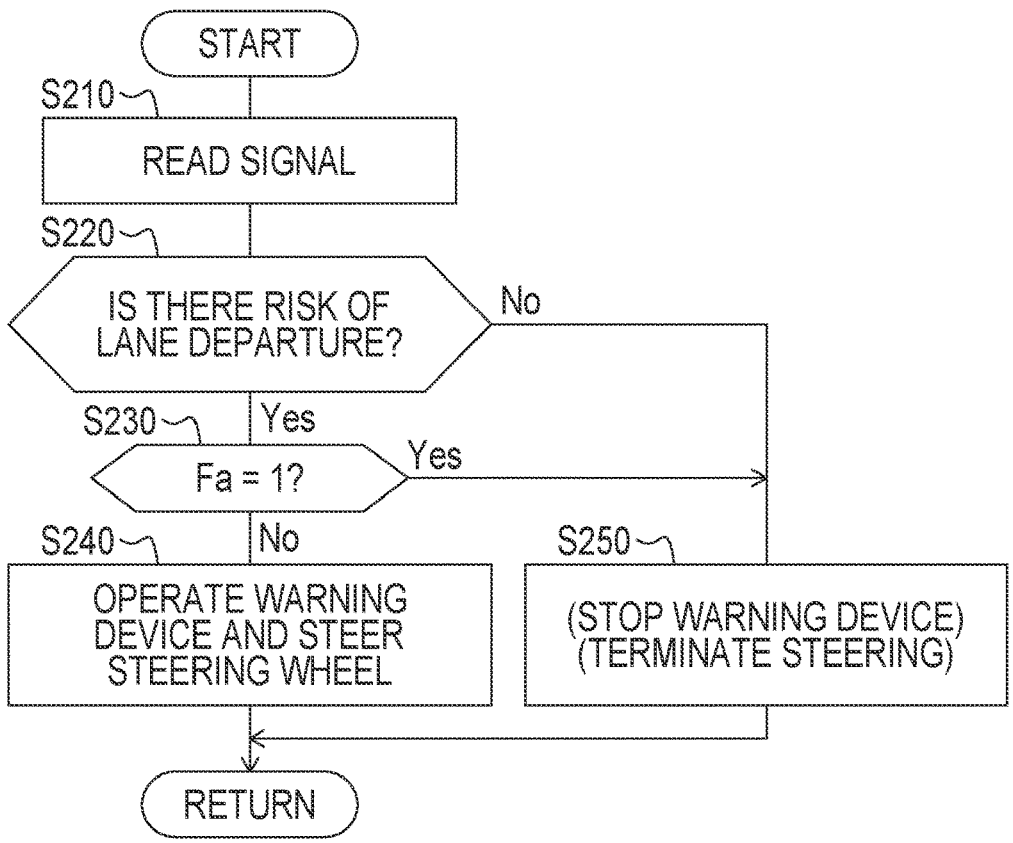
FIG. 2 is a flowchart showing a routine for a lane departure prevention control according to a first embodiment.
Figure 3:
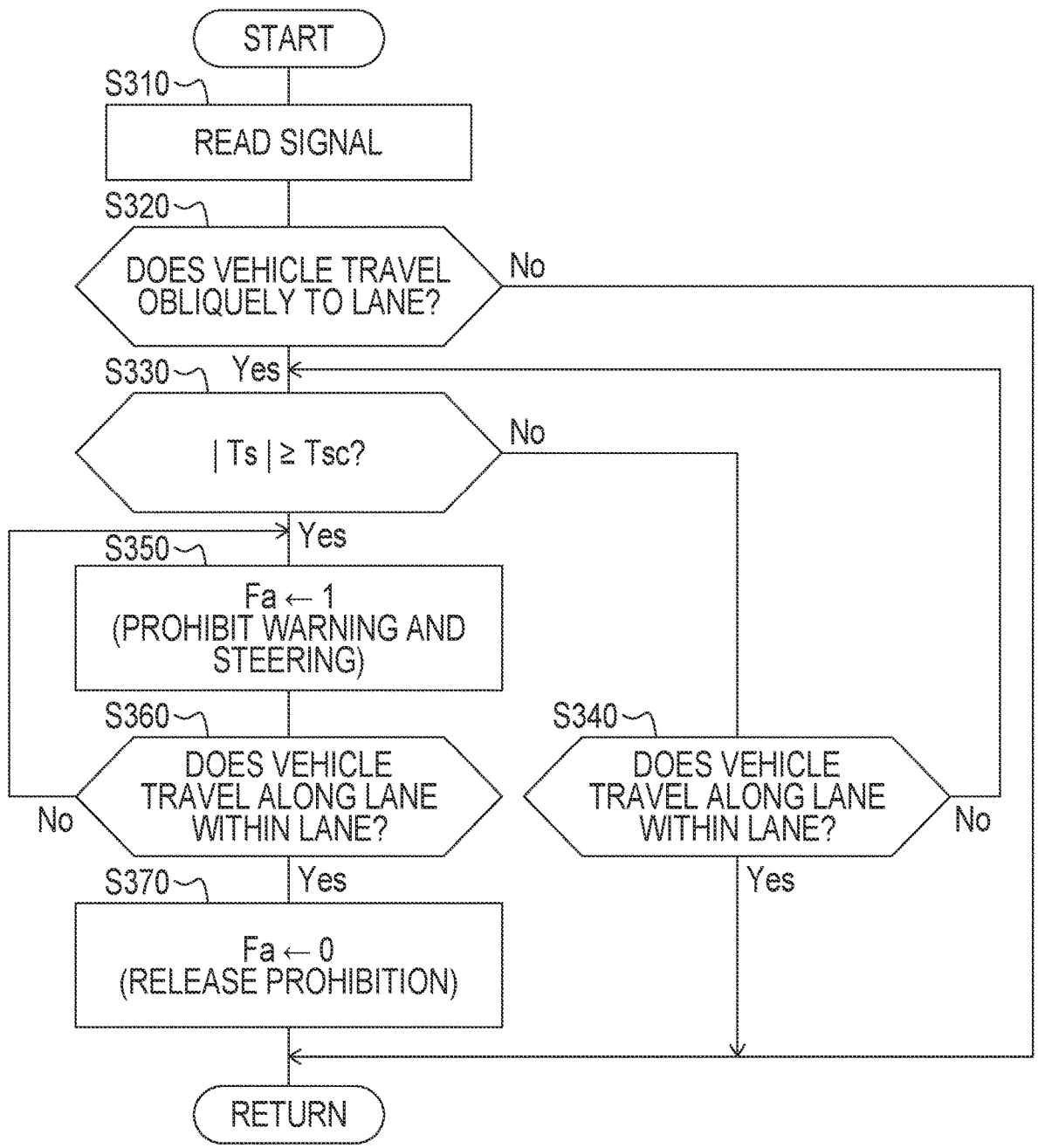
FIG. 3 is a flowchart showing a routine for a warning and steering prohibition control according to the first embodiment.

In particular, the ROM of the departure prevention ECU 16 stores a program of the lane departure prevention control corresponding to a flowchart shown in FIG. 2 and a program of a warning and steering prohibition control corresponding to a flowchart shown in FIG. 3. The CPU of the departure prevention ECU 16 performs the lane departure prevention control and the warning and steering prohibition control in accordance with the flowcharts shown in FIGS. 2 and 3, respectively.

As will be described in detail below, the lane departure prevention device 10 determines whether or not the vehicle travels obliquely to the lane based on the image information in front of the vehicle 18 acquired by the CCD camera 12. When a determination is made that the vehicle travels obliquely to the lane and a determination is made that an absolute value of the steering torque Ts detected by the torque sensor 28 is equal to or greater than reference steering torque Tsc, the lane departure prevention device 10 starts prohibition of issuing of the warning and prohibition of steering of the steering wheel. Further, in a situation where issuing of the warning and steering of the steering wheel are prohibited, when a determination is made that the vehicle terminates traveling obliquely to the lane based on the image information acquired by the CCD camera 12, the lane departure prevention device 10 releases the prohibition of issuing of the warning and the prohibition of steering of the steering wheel.

Next, a routine for the lane departure prevention control according to the first embodiment will be described with reference to the flowchart shown in FIG. 2. The control in accordance with the flowchart shown in FIG. 2 is performed by the CPU of the departure prevention ECU 16 repetitively at predetermined time intervals when an ignition switch (not shown in FIG. 1) is turned on.

First, in step S210, the CPU reads a signal or the like indicating the image information in front of the vehicle 18 detected by the CCD camera 12.

In step S220, the CPU specifies the lane based on the image information in front of the vehicle 18, and determines whether or not there is the risk that the vehicle departs from the lane in a manner known in the technical field based on a change in the positional relationship of the vehicle 18 with respect to the lane. The CPU advances the lane departure prevention control to step S250 when a negative determination is made, and advances the lane departure prevention control to step S230 when a positive determination is made.

In step S230, the CPU determines whether or not a flag Fa of the prohibition of the lane departure prevention is 1, that is, whether or not issuing of the warning and steering of the steering wheel are prohibited. The CPU advances the lane departure prevention control to step S250 when a positive determination is made, that is, when the determination is made that the flag Fa is 1, and issues the warning by operating the warning device 14 and steers the steering wheel in step S240 when a negative determination is made. Note that the flag Fa is initialized to zero at the start of the lane departure prevention control, that is, when the ignition switch (not shown in FIG. 1) is switched from off to on, and then is set to zero or 1 in accordance with the flowchart shown in FIG. 3 as described below.

In step S250, in a situation where the warning device 14 is operated, the CPU stops the warning device, terminates steering of the steering wheel, and then temporarily terminates the lane departure prevention control. In a situation where the warning device 14 is not operated and the steering wheel is not steered, the CPU temporarily terminates the lane departure prevention control as it is.

Next, a routine for the warning and steering prohibition control according to the first embodiment will be described with reference to the flowchart shown in FIG. 3. The control in accordance with the flowchart shown in FIG. 3 is also performed by the CPU of the departure prevention ECU 16 repetitively at predetermined time intervals when the ignition switch (not shown in FIG. 1) is turned on. Note that in the following description, the warning and steering prohibition control is simply referred to as "control". The same applies to the routines for the warning and steering prohibition control in other embodiments to be described below.

First, in step S310, the CPU reads the signal or the like indicating the image information in front of the vehicle 18 detected by the CCD camera 12.

In step S320, the CPU specifies the lane based on the image information in front of the vehicle 18 and determines whether or not the vehicle 18 travels obliquely to the lane. The CPU temporarily terminates the control when a negative determination is made, and advances the control to step S330 when a positive determination is made.

Figure 7:
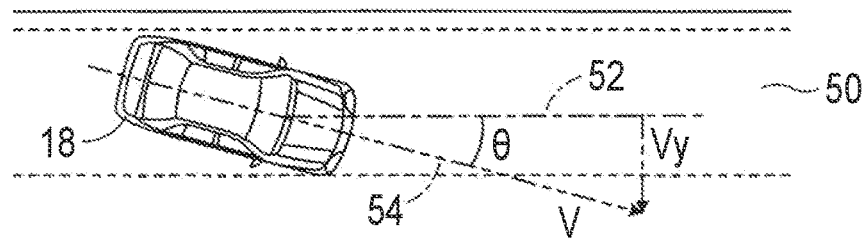
FIG. 7 is a diagram showing a manner of calculation of a movement speed Vy of a vehicle in a direction perpendicular to a longitudinal direction of a lane.

In this case, the determination may be made as to whether or not the vehicle 18 travels obliquely to the lane, for example, in the following manner. First, as shown in FIG. 7, an angle θ formed by a traveling direction 54 of the vehicle 18 with respect to a longitudinal direction 52 of a lane 50 is estimated based on the image information in front of the vehicle 18. The angle θ is a positive value when the traveling direction 54 of the vehicle 18 is located on a left side with respect to the longitudinal direction 52 of the lane 50. A movement speed Vy of the vehicle 18 in a direction perpendicular to the longitudinal direction 52 of the lane 50 is estimated as V sin θ based on the angle θ and the vehicle speed V. In a case where Ka and Kb are defined as positive fixed coefficients, when an absolute value |KaVy+KbdVy| of a linear sum of the movement speed Vy and a temporal change rate dVy of the movement speed is equal to or greater than an oblique-traveling start reference value Vys, the determination is made that the vehicle 18 travels obliquely to the lane.

Figure 8:
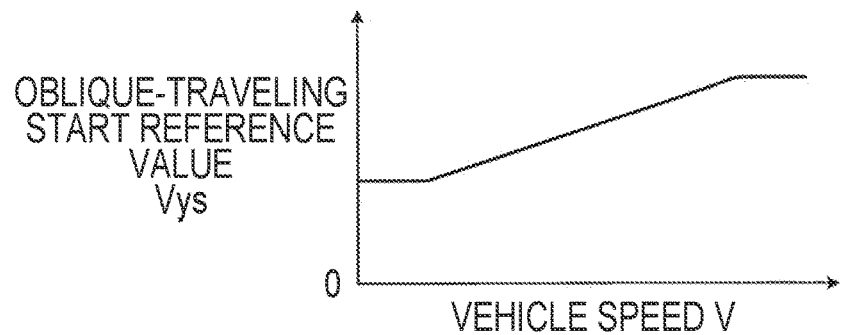
FIG. 8 is a graph showing a relationship between a vehicle speed V and an oblique-traveling start reference value Vys.

Note that even when a degree of oblique-traveling of the vehicle 18 is the same, the absolute value |KaVy+KbdVy| of the linear sum is greater as the vehicle speed V is higher. Therefore, an oblique-traveling start reference value Vys may be a positive constant, but in the first embodiment and other embodiments to be described below, the oblique-traveling start reference value Vys is variably set to be greater as the vehicle speed V is higher, in response to the vehicle speed, as shown in FIG. 8. Therefore, the determination can be appropriately made as to whether or not the vehicle 18 travels obliquely to the lane, regardless of the vehicle speed, as compared with a case where the oblique-traveling start reference value Vys is a constant.

In step S330, the CPU determines whether or not the driver intends to change the traveling direction of the vehicle by determining whether or not the absolute value of the steering torque Ts is equal to or greater than the reference steering torque Tsc. The CPU advances the control to step S350 when a positive determination is made, and advances the control to step S340 when a negative determination is made.

Figure 9:
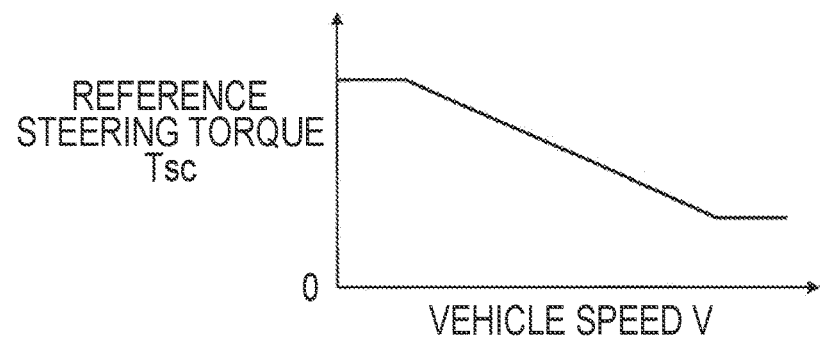
FIG. 9 is a graph showing a relationship between the vehicle speed V and a reference steering torque Tsc.

Note that the steering resistance when the steering wheel is steered by the steering operation of the driver is smaller as the vehicle speed V is higher. Therefore, the reference steering torque Tsc may be a positive constant, but in the first embodiment and other embodiments to be described below, the reference steering torque Tsc is variably set to be smaller as the vehicle speed V is higher, in response to the vehicle speed, as shown in FIG. 9. Therefore, the determination can be appropriately made as to whether or not the driver intends to change a traveling direction of the vehicle, regardless of the vehicle speed, as compared with a case where the reference steering torque Tsc is a constant.

In step S340, the CPU determines whether or not the vehicle 18 travels along the lane within the lane, that is, whether or not the vehicle 18 terminates oblique-traveling and is returned to a normal traveling state, based on the image information in front of the vehicle 18. The CPU returns the control to step S330 when a negative determination is made, and temporarily terminates the control when a positive determination is made.

In step S350, the CPU sets the flag Fa to 1 to prohibit the lane departure prevention such that issuing of the warning and steering of the steering wheel are prohibited.

In step S360, the CPU makes the same determination in the same manner as in step S340. When a negative determination is made, that is, when the determination is made that the vehicle 18 does not travel along the lane within the lane, the CPU returns the control to step S350. On the other hand, when a positive determination is made, that is, when the determination is made that the vehicle 18 travels along the lane within the lane, the CPU resets the flag Fa to zero, releases the prohibition of issuing of the warning and the prohibition of steering of the steering wheel, and permits the lane departure prevention in step S370.

Second Embodiment

Figure 4:
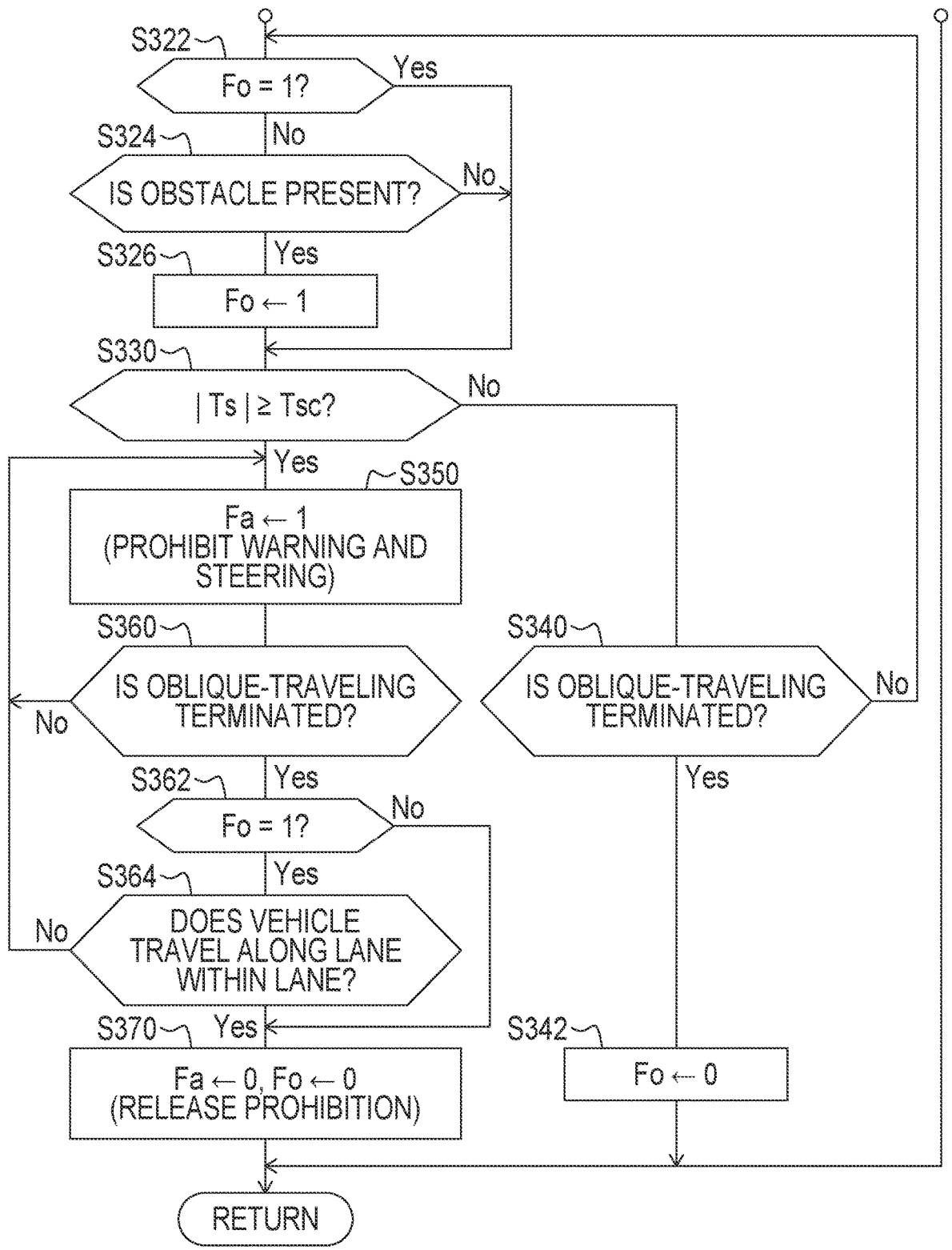
FIG. 4 is a flowchart showing a main part of a routine for a warning and steering prohibition control according to a second embodiment.

In a second embodiment, the lane departure prevention control is performed in accordance with the flowchart shown in FIG. 2 in the same manner as in the first embodiment, and the warning and steering prohibition control are performed in accordance with a flowchart shown in FIG. 4.

Note that although not shown in FIG. 4, steps S310 and S320 are performed in the same manner as steps S310 and S320 of the first embodiment, respectively, and step S322 is performed when a positive determination is made in step S320. In addition, steps S330, S350, and S370 are performed in the same manner as steps S330, S350, and S370 of the first embodiment, respectively. Therefore, the description of these steps will be omitted.

In step S322, the CPU determines whether or not a flag Fo of the presence or absence of an obstacle is 1, that is, whether or not a determination is made that the obstacle is present in front of the vehicle 18 in step S324 to be described below. The CPU advances the control to step S330 when a positive determination is made, that is, when a determination is made that the flag Fo is 1, and advances the control to step S324 when a negative determination is made. Note that the flag Fo is initialized to zero at the start of the warning and steering prohibition control, that is, when the ignition switch (not shown in FIG. 1) is switched from off to on, and then is set to zero or 1 in accordance with the flowchart shown in FIG. 4 as described below.

In step S324, the CPU determines whether or not the obstacle is present in front of the vehicle 18 based on the image information in front of the vehicle 18 detected by the CCD camera 12. Therefore, the CCD camera 12 and the departure prevention ECU 16 cooperate with each other to function as an obstacle detection device that detects the obstacle in front of the vehicle 18. The CPU advances the control to step S330 when a negative determination is made, and sets the flag Fo to 1 in step S326 when a positive determination is made, that is, when the determination is made that the obstacle is present in front of the vehicle 18.

Note that the obstacle is a concept including a creature, such as a pedestrian or a wild animal, in addition to an object, such as a vehicle that is stopped and parked or a falling object, and refers to an obstacle that inhibits traveling of the vehicle without performing steering for avoiding.

In step S340, the CPU specifies the lane based on the image information in front of the vehicle 18 and determines whether or not the vehicle 18 terminates traveling obliquely to the lane. The CPU returns the control to step S322 when a negative determination is made, and resets the flag Fo to zero in step S342 and then temporarily terminates the control when a positive determination is made.

In step S360 performed after step S350, in the same manner as in step S340, the CPU specifies the lane based on the image information in front of the vehicle 18 and determines whether or not the vehicle 18 terminates traveling obliquely to the lane. The CPU returns the control to step S350 when a negative determination is made, and advances the control to step S362 when a positive determination is made.

The determination as to whether or not the vehicle 18 terminates traveling obliquely to the lane in steps S340 and S360 may be made, for example, in the following manner. First, in the same manner as in a case of step S330 described above, the absolute value $|KaVy+KbdVy|$ of the linear sum of the movement speed Vy and the temporal change rate dVy of the movement speed is calculated. Further, when the absolute value $|KaVy+KbdVy|$ of the linear sum is equal to or smaller than an oblique-traveling termination reference value Vye, the determination is made that the vehicle 18 terminates traveling obliquely to the lane.

Figure 10:
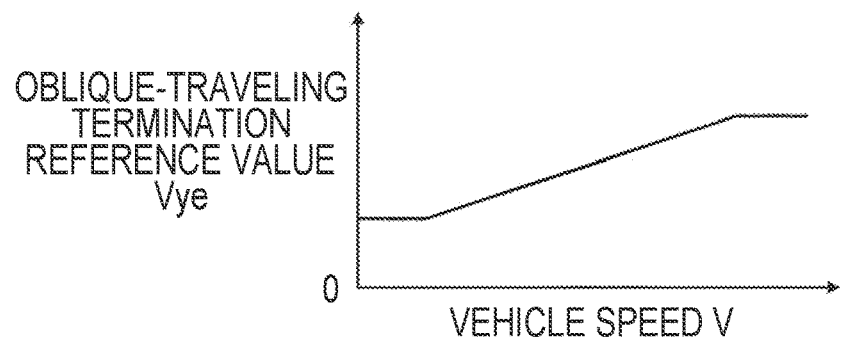
FIG. 10 is a graph showing a relationship between the vehicle speed V and an oblique-traveling termination reference value Vye.

Note that, as described above, even when the degree of oblique-traveling of the vehicle 18 is the same, the absolute value $|KaVy+KbdVy|$ of the linear sum is greater as the vehicle speed V is higher. Therefore, the oblique-traveling termination reference value Vye may be a positive constant, but in the second embodiment and a third embodiment to be described below, the oblique-traveling termination reference value Vye is variably set to be greater as the vehicle speed V is higher, in response to the vehicle speed, as shown in FIG. 10. Therefore, the determination can be appropriately made as to whether or not the vehicle 18 terminates traveling obliquely to the lane, regardless of the vehicle speed, as compared with a case where the oblique-traveling termination reference value Vye is a constant.

In step S362, the CPU determines whether or not the flag Fo is 1, that is, whether or not the determination is made that the obstacle is present in front of the vehicle 18 in step S324. The CPU advances the control to step S370 when a negative determination is made, and advances the control to step S364 when a positive determination is made.

In step S364, the CPU determines whether or not the vehicle 18 travels along the lane within the lane, that is, whether or not the vehicle 18 is returned to the normal traveling state, based on the image information in front of the vehicle 18. When a negative determination is made, the CPU returns the control to step S350, and when a positive determination is made, in step S370, the CPU resets the flag Fa to zero, releases the prohibition of issuing of the warning and the prohibition of steering of the steering wheel, and resets the flag Fo to zero.

Third Embodiment

Figure 5:
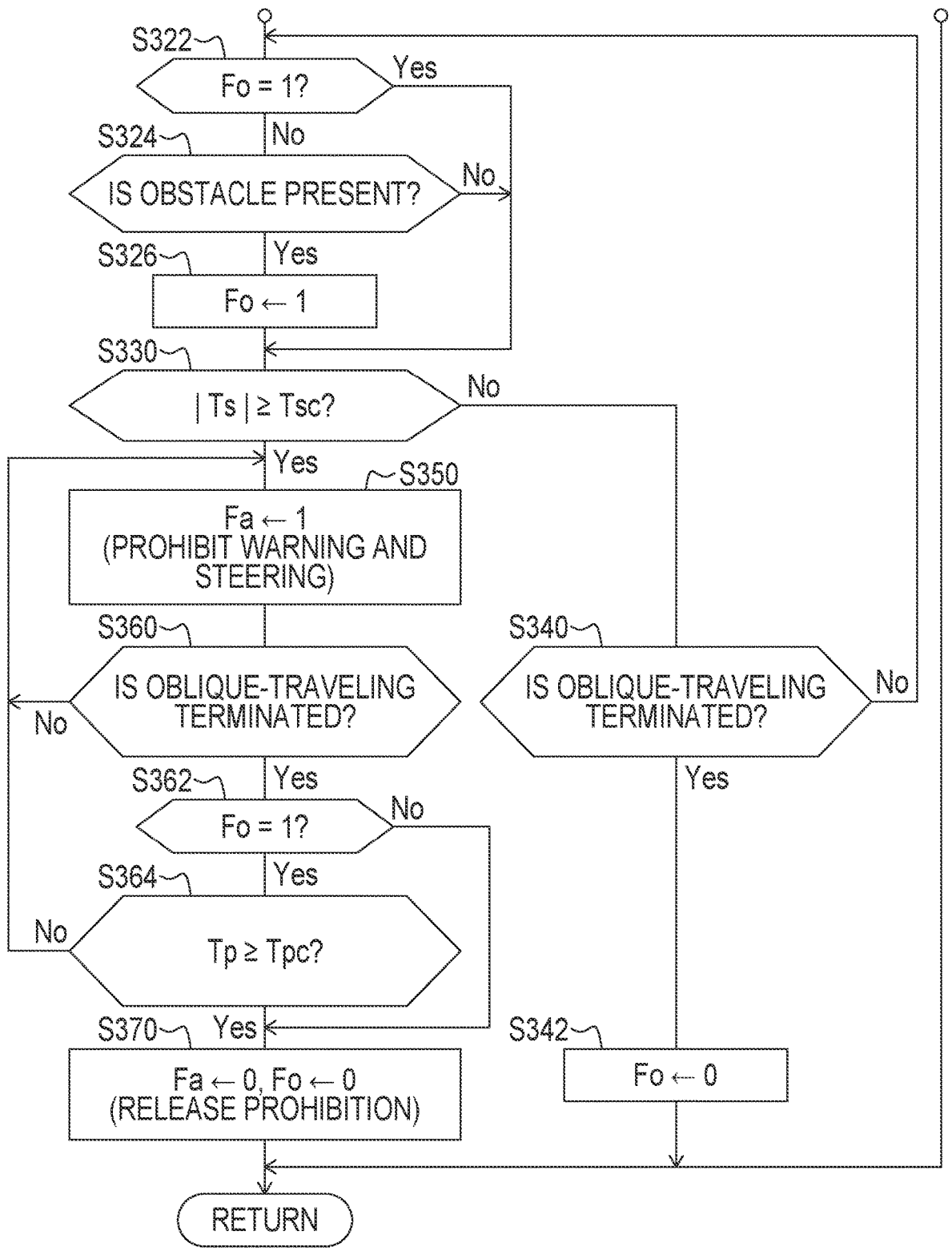
FIG. 5 is a flowchart showing a main part of a routine for a warning and steering prohibition control according to a third embodiment.

In the third embodiment, the lane departure prevention control is performed in accordance with the flowchart shown in FIG. 2 in the same manner as in the first embodiment, and the warning and steering prohibition control are performed in accordance with a flowchart shown in FIG. 5.

Note that although not shown in FIG. 5, steps S310 and S320 are performed in the same manner as steps S310 and S320 of the first embodiment, respectively, and step S322 is performed when a positive determination is made in step S320. In addition, steps S322 to S362 and step S370 are performed in the same manner as steps S322 to S362 and step S370 of the second embodiment, respectively. Therefore, the description of these steps will be omitted.

When a positive determination is made in step S362, the CPU advances the control to step S364. In step S364, the CPU determines whether or not elapsed time Tp after the determination is made that the vehicle 18 terminates traveling obliquely to the lane in step S360 is equal to or longer than reference time Tpc. The CPU returns the control to step S350 when a negative determination is made, and advances the control to step S370 when a positive determination is made.

Figure 11:
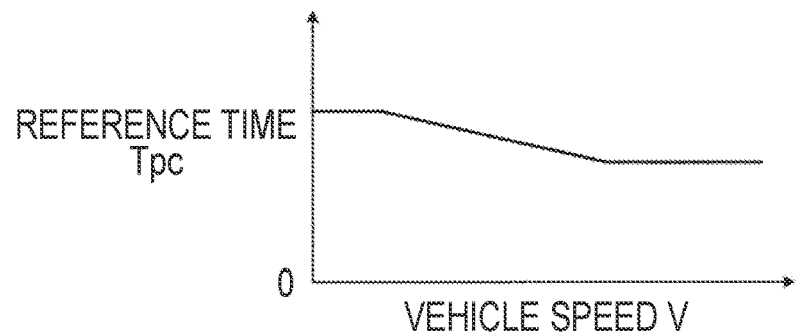
FIG. 11 is a graph showing a relationship between the vehicle speed V and reference time Tpc.

Note that in a case where the vehicle 18 travels while avoiding the obstacle, the vehicle travels obliquely to bypass the obstacle, terminates oblique-traveling, travels along the lane, and then travels obliquely to be returned to the original lane. Time needed for the vehicle to be returned to the original lane after the vehicle terminates oblique-traveling and travels along the lane is shorter as the vehicle speed V is higher. Therefore, the reference time Tpc may be a positive constant, but in the third embodiment and a modification example of the third embodiment to be described below, the oblique-traveling start reference value Vys is variably set to be smaller as the vehicle speed V is higher, in response to the vehicle speed, as shown in FIG. 11. Therefore, the determination can be appropriately made as to whether or not the prohibition of the lane departure prevention should be maintained, regardless of the vehicle speed, as compared with a case where the reference time Tpc is a constant.

Modification Example of Third Embodiment

Figure 6:
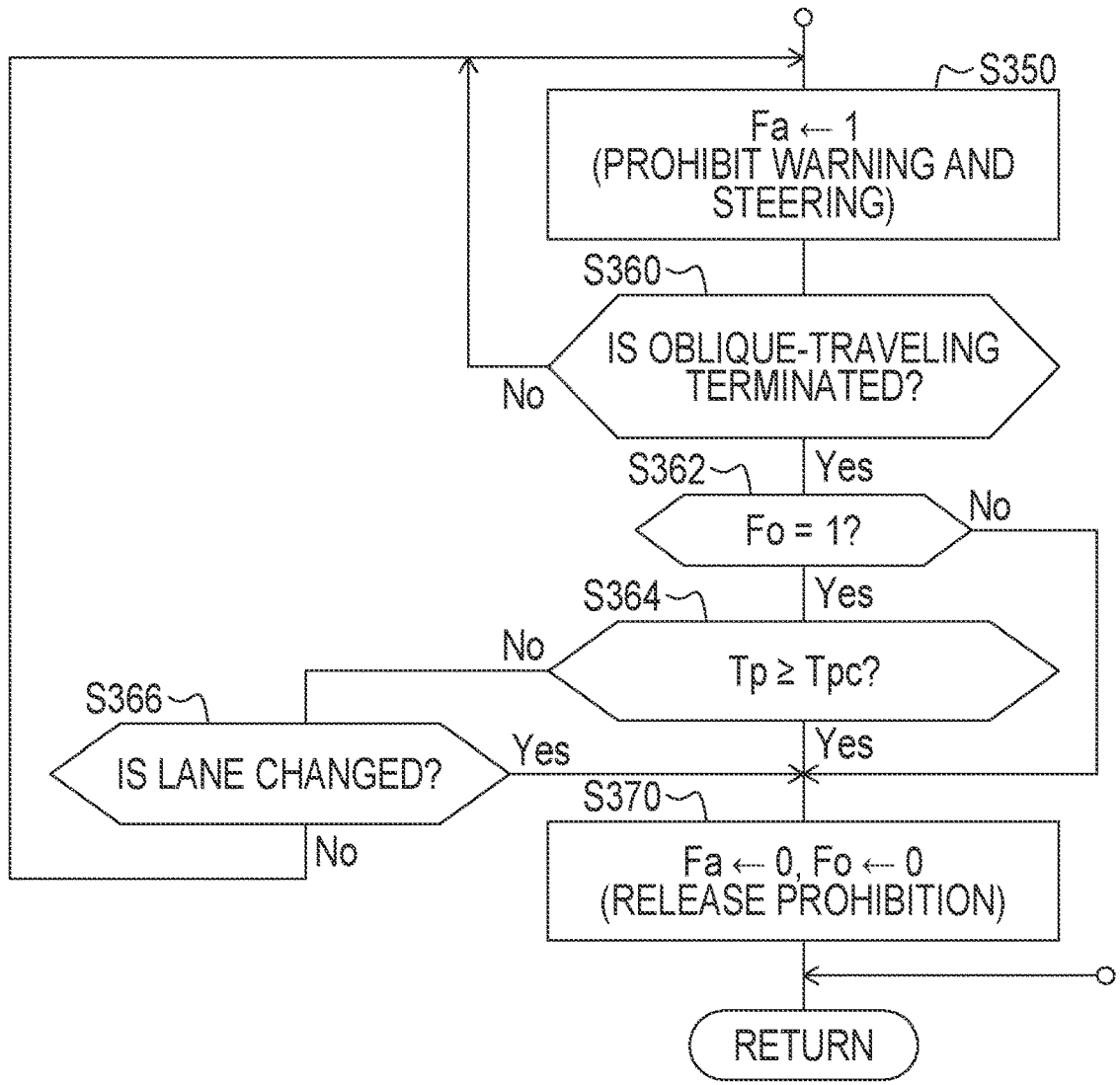
FIG. 6 is a flowchart showing a main part of a routine for a warning and steering prohibition control according to a modification example of the third embodiment.

In this modification example, a control of the prohibition of the lane departure prevention is performed in accordance with a flowchart shown in FIG. 6. Note that although not shown in FIG. 6, steps S310 to S362 and step S370 are performed in the same manner as in steps S310 to S362 and step S370 of the third embodiment, respectively.

The CPU advances the control to step S370 when a positive determination is made in step S364, and advances the control to step S366 when a negative determination is made.

In step S366, the CPU determines whether or not the vehicle 18 changes the lane. The CPU returns the control to step S350 when a negative determination is made, and advances the control to step S370 when a positive determination is made. Note that the determination as to whether or not the vehicle changes the lane may be performed in any manner known in the technical field.

According to each of the embodiments described above and the modification example, when there is the risk that the vehicle departs from the lane, a positive determination is made in step S220 of the flowchart shown in FIG. 2. When the flag Fa of the warning and steering prohibition is zero, a negative determination is made in step S230, the warning is issued in step S240, and the steering wheel is steered.

On the other hand, when the flag Fa of the warning and steering prohibition is 1, a positive determination is made in step S230, the warning device 14 is not operated and the warning is not issued in step S250, and the steering wheel is not steered.

The flag Fa of the warning and steering prohibition is set to 1 or zero by the control in accordance with the flowchart shown in FIG. 3. When a positive determination is made in steps S320 and S330, that is when the determination is made that the vehicle 18 travels obliquely to the lane and the determination is made that the absolute value of the steering torque Ts is equal to or greater than the reference steering torque Tsc, the flag Fa is set to 1.

According to each of the embodiments described above and the modification example, when the determination is made that the vehicle 18 travels obliquely to the lane and the determination is made that the absolute value of the steering torque Ts is equal to or greater than the reference steering torque Tsc, the prohibition of issuing of the warning and the prohibition of steering of the steering wheel are started. Therefore, before the risk that the vehicle 18 departs from the lane occurs, the determination can be made as to whether or not the driver intends to cause the vehicle to depart from the lane based on his/her own intention. Therefore, the determination can be made as to whether or not the driver intends to cause the vehicle to depart from the lane and issuing of the warning and steering of the steering wheel can be prohibited before the risk that the vehicle departs from the lane is detected, so that the driver can be prevented from feeling anxiety due to the warning and steering, in a case where the driver causes the vehicle to depart from the lane based on his/her own intention.

In addition, in a case where the vehicle 18 departs from the lane due to the driver's carelessness, the steering torque does not become a large value even when the vehicle travels obliquely to the lane. Therefore, even when the determination is made that the vehicle travels obliquely to the lane, the determination is not made that the absolute value of the steering torque Ts is equal to or greater than the reference steering torque Tsc, so that the prohibition of issuing of the warning and the prohibition of steering of the steering wheel are not started. Therefore, since the warning device can be operated to issue the warning, the driver can be alerted, and the steering wheel can be steered to prevent the vehicle from departing from the lane.

As described above, in the lane departure prevention device in the related art disclosed in JP 09-142327 A, even in a case where the risk that the vehicle departs from the lane is detected, when a sudden steering operation by the driver is detected, the warning and steering of the steering wheel is regulated. Therefore, depending on setting of a threshold value for detecting the sudden steering operation, the sudden steering operation is detected even in a case where the vehicle travels on a curve, so that in a situation where the vehicle travels on the curve, even when the risk that the vehicle departs from the lane occurs, it is not possible to alert the driver by the warning and to prevent the vehicle from departing from the lane by steering of the steering wheel.

According to each of the embodiments described above and the modification example, when the determination is made that the vehicle travels obliquely to the lane and the determination is made that the absolute value of the steering torque Ts is equal to or greater than the reference steering torque Tsc, the prohibition of issuing of the warning and the prohibition of steering of the steering wheel are started. Therefore, in a case where the vehicle departs from the lane to an outside of the curve when the vehicle travels on the curve, the determination is not made that the steering torque is equal to or greater than the reference steering torque, so that the prohibition of issuing of the warning and the prohibition of steering of the steering wheel are not started. Therefore, it is possible to issue the warning for providing an alert that there is a risk that the vehicle departs from the lane and to steer the steering wheel.

In addition, according to each of the embodiments described above and the modification example, in a situation where the operation of the warning device 14 is prohibited, when the determination is made that the vehicle 18 terminates traveling obliquely to the lane (step S360), the prohibition of the operation of the warning device 14 is released (step S370). Therefore, it is possible to prevent the prohibition of the operation of the warning device from being unnecessarily continued, and to generate a needed warning when there is the risk that the vehicle 18 departs from the lane.

Further, according to each of the embodiments described above and the modification example, the movement speed Vy of the vehicle 18 in the direction perpendicular to the lane is estimated, and when the absolute value |KaVy+KbdVy| of the linear sum of the movement speed Vy and the temporal change rate dVy of the movement speed is equal to or greater than the oblique-traveling start reference value Vys, the determination is made that the vehicle travels obliquely to the lane. Therefore, the determination can be appropriately made as to whether or not the vehicle travels obliquely to the lane as compared with a case where the determination is made whether or not the vehicle travels obliquely to the lane based on one of the movement speed Vy and the temporal change rate dVy of the movement speed.

Further, according to each of the embodiments described above and the modification example, in the situation where issuing of the warning and steering of the steering wheel are prohibited, when the absolute value |KaVy+KbdVy| of the linear sum of the movement speed Vy and the temporal change rate dVy of the movement speed is equal to or smaller than the oblique-traveling termination reference value Vye, the determination is made that the vehicle terminates traveling obliquely to the lane. Therefore, the determination can be appropriately made as to whether or not the vehicle terminates traveling obliquely to the lane as compared with a case where the determination is made that the vehicle terminates traveling obliquely to the lane based on one of the movement speed Vy and the temporal change rate dVy of the movement speed.

Next, as a specific example of the operation of each of the embodiments described above and the modification example, a case where the vehicle 18 changes the lane and a case where the vehicle 18 overtakes a preceding vehicle will be described.

Lane Change

Figure 12:
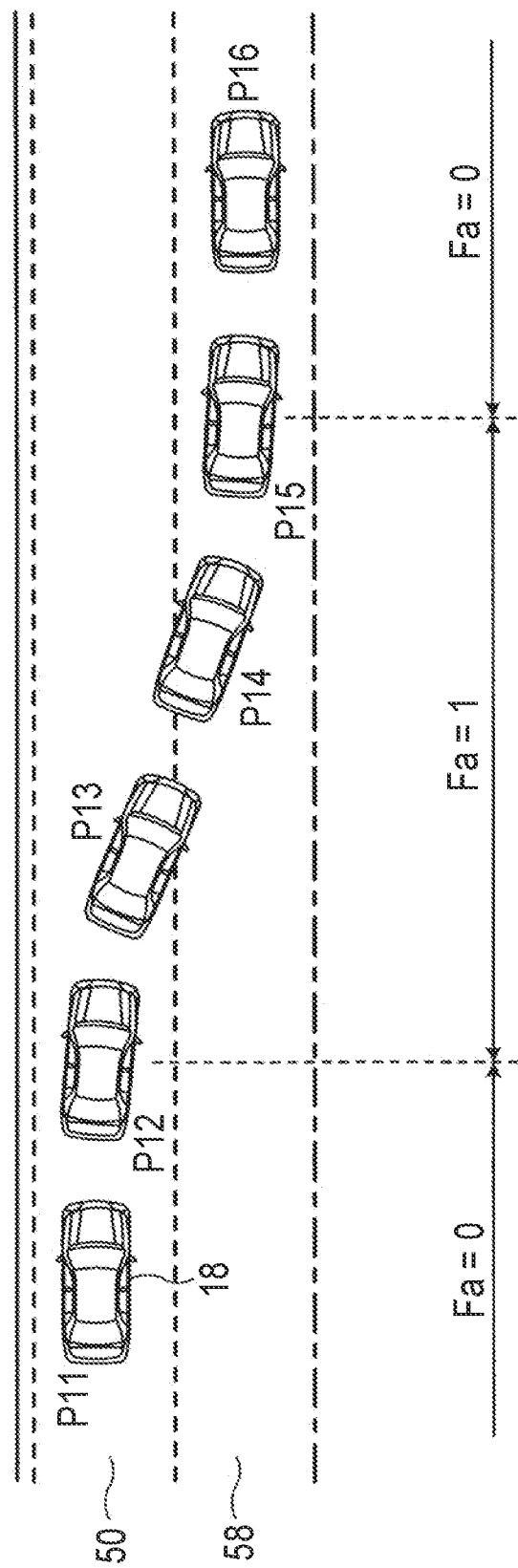
FIG. 12 is a diagram showing an example of an operation in the first embodiment in a case where the vehicle changes the lane.

As shown in FIG. 12, it is assumed that from a state where the vehicle 18 travels along the lane within the lane 50 (P11), the vehicle 18 starts traveling obliquely to the lane 50 in response to the steering operation of the driver (P12), and a front end portion of the vehicle 18 is moved to an adjacent lane 58 (P13). Further, it is assumed that a main part of the vehicle 18 is moved to the adjacent lane 58 (P14), the angle formed by the longitudinal direction of the vehicle 18 with respect to a direction of the lane 58 is significantly small (P15), and the vehicle 18 is in a state of traveling along the lane within the lane 58 (P16).

For example, when the vehicle 18 is in the state of P12, a positive determination is made in steps S320 and S330, so that the flag Fa is set to 1 in step S350, and the prohibition of issuing of the warning and the prohibition of steering of the steering wheel are started. In addition, when the vehicle 18 is in the state of P15 or P16, a positive determination is made in step S360 or steps S360 and S364, so that the flag Fa is reset to zero in step S350, the prohibition of issuing of the warning and the prohibition of steering of the steering wheel are released.

Therefore, since the flag Fa is set to 1 from the state of P12 to the state of P15 or P16, the warning is not issued and the steering wheel is not steered even when the determination is made that there is the risk that the vehicle 18 departs from the lane 50 after the state of P12. Therefore, it is possible to prevent the driver from feeling anxiety due to the warning or steering in a situation where the driver changes the lane based on his/her own intention.

Overtaking Preceding Vehicle

Figure 13:
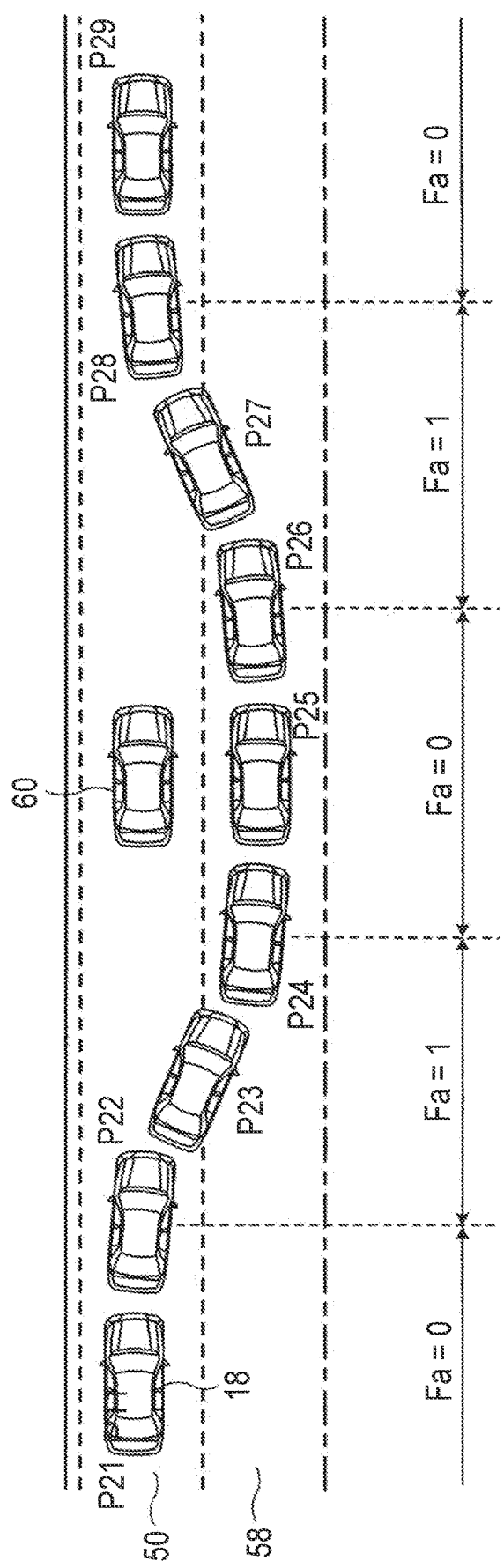
FIG. 13 is a diagram showing an example of an operation in the first embodiment in a case where the vehicle overtakes a preceding vehicle.

As shown in FIG. 13, a case where a preceding vehicle 60 having a low vehicle speed is present in front of the vehicle 18 within the lane 50 on which the vehicle 18 travels and the vehicle 18 overtakes the preceding vehicle 60 via the adjacent lane 58 will be described.

It is assumed that from a state where the vehicle 18 travels along the lane within the lane 50 (P21), the vehicle 18 starts traveling obliquely to the lane 50 in response to the steering operation of the driver (P22), and the front end portion of the vehicle 18 is moved to the adjacent lane 58 (P23). Further, it is assumed that the vehicle 18 is moved to the adjacent lane 58, the angle formed by the longitudinal direction of the vehicle 18 with respect to the direction of the lane 58 is significantly small (P24), and the vehicle 18 is in a state of traveling along the lane within the lane 58 (P25). Further, it is assumed that the vehicle 18 starts traveling obliquely to the lane 58 (P26), the front end portion of the vehicle 18 is moved to the original lane 50 (P27), the angle formed by the longitudinal direction of the vehicle 18 with respect to the direction of the lane 50 is significantly small (P28), and the vehicle 18 is in a state of traveling along the lane within the lane 50 (P29).

For example, when the vehicle 18 is in the state of P22, a positive determination is made in steps S320 and S330, so that the flag Fa is set to 1 in step S350, and the prohibition of issuing of the warning and the prohibition of steering of the steering wheel are started. In addition, when the vehicle 18 is in the state of P24, a positive determination is made in step S360 or steps S360 and S364, so that the flag Fa is reset to zero in step S350, the prohibition of issuing of the warning and the prohibition of steering of the steering wheel are released.

In addition, when the vehicle 18 is in the state of P26, a positive determination is made in steps S320 and S330, so that the flag Fa is set to 1 in step S350, and the prohibition of issuing of the warning and the prohibition of steering of the steering wheel are started. Further, when the vehicle 18 is in the state of P15 or P16, a positive determination is made in step S360 or steps S360 and S364, so that the flag Fa is reset to zero in step S350, the prohibition of issuing of the warning and the prohibition of steering of the steering wheel are released.

Therefore, since the flag Fa is set to 1 from the state of P22 to the state of P24 and from the state of P26 to the state of P28, the warning is not issued and the steering wheel is not steered even when the determination is made that there is the risk that the vehicle 18 departs from the lane 50 in these sections. Therefore, it is possible to prevent the driver from feeling anxiety due to the warning or steering in a situation where the driver overtakes the preceding vehicle based on his/her own intention.

Note that although the flag Fa is reset to zero from the state of P24 to the state of P26, the determination is not made that there is the risk that the vehicle 18 departs from the lane 50 in this section. Therefore, the driver does not feel anxiety due to the warning or steering in this section.

In particular, in the first embodiment, in the situation where issuing of the warning and steering of the steering wheel are prohibited, when the determination is made that the vehicle travels along the lane within the lane, the determination is made that the vehicle terminates traveling obliquely to the lane. Therefore, according to the first embodiment, when the absolute value |KaVy+KbdVy| of the linear sum is equal to or smaller than the oblique-traveling termination reference value Vye, timing at which the prohibition of the warning is released can be delayed as compared with a case where the determination is made that the vehicle terminates traveling obliquely to the lane.

In addition, in the second embodiment, in the situation where issuing of the warning and steering of the steering wheel are prohibited, when the obstacle in front of the vehicle is detected, the prohibition of issuing of the warning and the prohibition of steering of the steering wheel are not released until the determination is made that the vehicle travels along the lane within the lane even when the determination is made that the vehicle terminates traveling obliquely to the lane. Therefore, according to the second embodiment, when the driver overtakes the obstacle in front of the vehicle based on his/her own intention, the prohibition of issuing of the warning and the prohibition of steering of the steering wheel are released, and the driver can be prevented from feeling anxiety due to the warning or steering.

Next, as a specific example of the operation of the second embodiment, a case where the vehicle 18 travels while avoiding the obstacle 60 on the lane will be described.

Obstacle Avoidance

Figure 14:
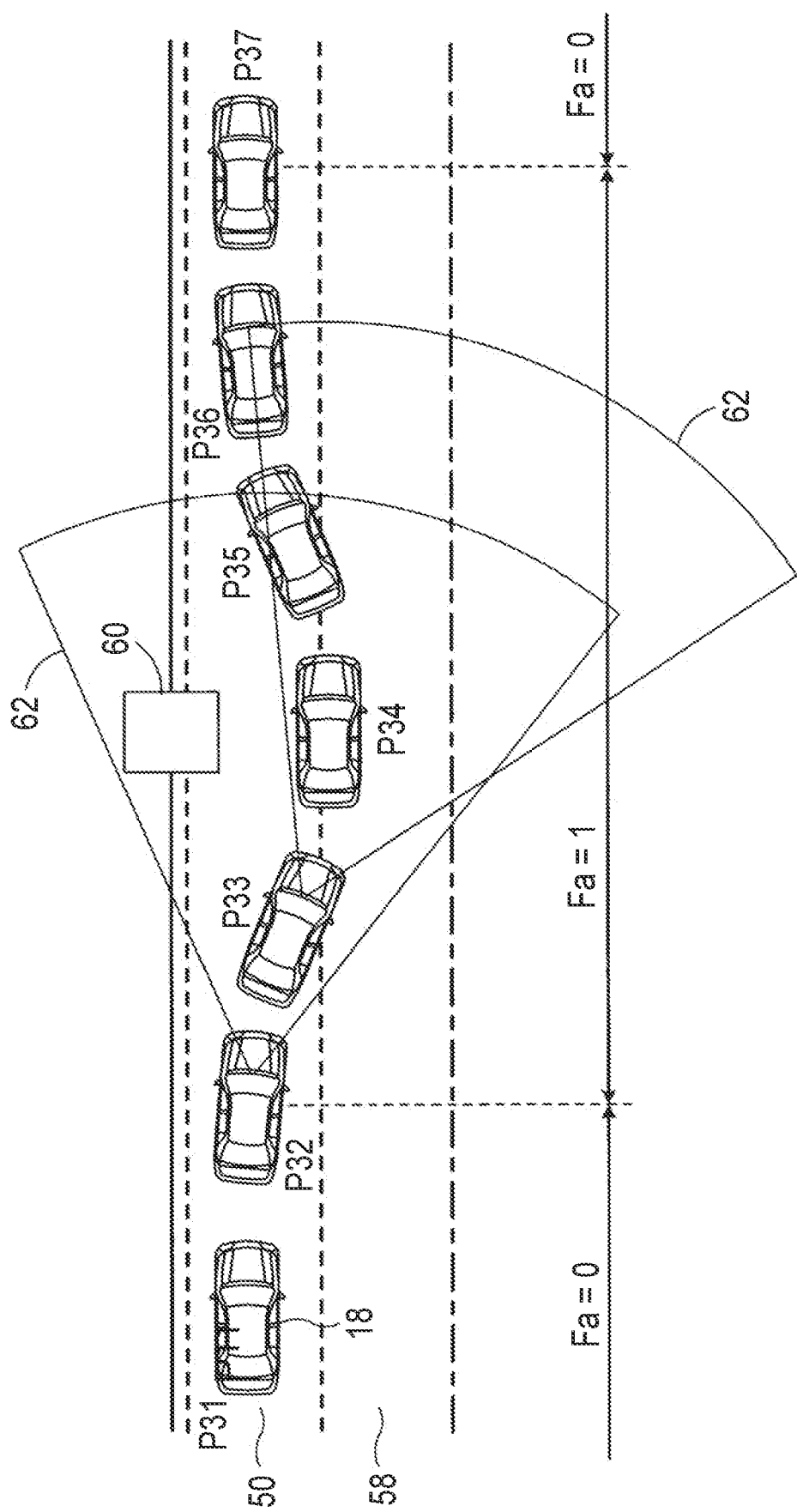
FIG. 14 is a diagram showing an example of an operation in the first embodiment in a case where the vehicle avoids an obstacle.

As shown in FIG. 14, it is assumed that from a state where the vehicle 18 travels along the lane within the lane 50 (P31), the vehicle 18 starts traveling obliquely to the lane 50 in response to the steering operation of the driver (P32), and the front end portion of the vehicle 18 is moved to an adjacent lane 58 (P33). Further, it is assumed that the vehicle 18 travels along the lanes 50, 58 while straddling the lanes 50, 58 (P34), and the front end portion of the vehicle 18 is moved to the original lane 50 (P35). Further, it is assumed that the angle formed by the longitudinal direction of the vehicle 18 with respect to the direction of the lane 50 is significantly small (P36), and the vehicle 18 is in a state of traveling along the lane within the lane 50 (P37).

For example, when the vehicle 18 is in the state of P32, a positive determination is made in steps S320 and S330, so that the flag Fa is set to 1 in step S350, and the prohibition of issuing of the warning and the prohibition of steering of the steering wheel are started. In addition, when the vehicle 18 is in the state of P37, a positive determination is made in step S360, so that the flag Fa is reset to zero in step S370 and the prohibition of issuing of the warning and the prohibition of steering of the steering wheel are released.

Note that even in the section from the state of P33 to the state of P35, a positive determination is not made in the determination in step S360.

Therefore, since the flag Fa is set to 1 from the state of P32 to the state of P37, the warning is not issued and the steering wheel is not steered even when the determination is made that there is the risk that the vehicle 18 departs from the lane 50 after the state of P32. Therefore, it is possible to prevent the driver from feeling anxiety due to the warning or steering in a situation where the driver causes the vehicle to travel while avoiding the obstacle based on his/her own intention.

In FIG. 14, a range 62 shows an imaging range of the CCD camera 12. When the vehicle 18 is in the state of P32, the CCD camera 12 can image the obstacle 60, but when traveling for avoiding the obstacle progresses as in the state of P33 or subsequent states, the CCD camera 12 cannot image the obstacle 60.

According to the second embodiment, when the obstacle is detected, a positive determination is made in step S324, steering for avoiding the obstacle is performed by the driver, and a positive determination is made in step S330, step S324 is not performed, and solely step S350 and subsequent steps are performed. Therefore, when once the obstacle is detected and steering for avoiding the obstacle is performed by the driver, the determination is made that the vehicle travels along the lane within the lane regardless of whether or not the obstacle is detected, and then the prohibition of issuing of the warning and the prohibition of steering of the steering wheel are continued until a positive determination is made in step S330. Therefore, issuing of the warning and steering of the steering wheel can be efficiently prohibited until traveling of the vehicle 18 for avoiding the obstacle is completed.

Further, in the third embodiment, in the situation where issuing of the warning and steering of the steering wheel are prohibited, when the obstacle in front of the vehicle is detected, the prohibition of issuing of the warning and the prohibition of steering of the steering wheel are not released until the time equal to or longer than the reference time elapses after the determination is made that the vehicle terminates traveling obliquely to the lane, but according to the third embodiment, in the situation where the vehicle 18 travels while avoiding the obstacle, issuing of the warning and steering of the steering wheel can be surely prohibited until the time equal to or longer than the reference time elapses after the determination is made that the vehicle terminates traveling obliquely to the lane.

Further, in the modification example, when the determination is made that the vehicle changes the lane, the prohibition of issuing of the warning and the prohibition of steering of the steering wheel are released even when the time equal to or longer than the reference time elapse after the determination is made that the vehicle terminates traveling obliquely to the lane. Therefore, according to the modification example, when the vehicle terminates traveling obliquely to the lane, as in a case where the vehicle 18 changes the lane while avoiding the obstacle, the prohibition of issuing of the warning and the prohibition of steering of the steering wheel are released, and unnecessarily continuing the prohibition of issuing of the warning and the prohibition of steering of the steering wheel can be avoided.

In the above, the present disclosure has been described in detail with respect to the specific embodiments, but the applicable embodiment is not limited to the embodiments described above, and it is clear to those skilled in the art that various other embodiments can be adopted within the scope of the present disclosure.

For example, in each of the embodiments described above and the modification example, when the determination is made that the vehicle 18 travels obliquely to the lane 50 and the determination is made that the steering torque Ts is equal to or greater than the reference steering torque Tsc, the prohibition of issuing of the warning and the prohibition of steering of the steering wheel are started. However, the lane departure prevention device according to the embodiment of the present disclosure may be applied to a vehicle in which solely one of issuing of the warning and steering of the steering wheel is performed when the determination is made that there is the risk that the vehicle departs from the lane. In that case, the prohibition of one of issuing of the warning and steering of the steering wheel is started.

In addition, in each of the embodiments described above and the modification example, when the determination is made that there is the risk that the vehicle departs from the lane, issuing of the warning and steering of the steering wheel are started at the same time. However, a modification may be made in which when the determination is made that there is the risk that the vehicle departs from the lane, the warning is first issued, and when a determination is made that the risk of departure is increased, steering of the steering wheel is started.

For example, in each of the embodiments described above and the modification example, the vehicle position detection device that detects the position of the vehicle 18 with respect to the lane 50 is the CCD camera 12 and the departure prevention ECU 16 that cooperate with each other. However, the position of the vehicle 18 with respect to the lane 50 may be specified by a combination of road map information stored in a navigation device and a current location of the vehicle acquired by a GPS device. Further, the position of the vehicle 18 with respect to the lane 50 may be specified by a relationship of a trajectory of the vehicle 18 with respect to a trajectory of the preceding vehicle, and when a deviation of the trajectory of the vehicle 18 with respect to the trajectory is equal to or greater than a reference value, the determination may be made that the vehicle travels obliquely.

In addition, in each of the embodiments described above and the modification example, in step S320, the determination whether or not the vehicle 18 travels obliquely to the lane is made based on whether or not the linear sum |KaVy+KbdVy| is equal to or greater than the oblique-traveling start reference value Vys. However, the determination as to whether or not the vehicle 18 travels obliquely to the lane may be made based on one of the movement speed Vy or the temporal change rate dVy of the movement speed. Further, the determination as to whether or not the vehicle 18 travels obliquely to the lane may be made based on the change in the image information in front of the vehicle 18 acquired by the information acquisition device, such as the CCD camera 12.

In addition, in each of the embodiments described above and the modification example, the vehicle speed V is detected by the vehicle speed sensor 20. However, the vehicle speed V may be acquired based on the information supplied by the GPS device.

Further, in each of the embodiments described above and the modification example, the warning and steering prohibition control (FIG. 3) is performed separately from the lane departure prevention control (FIG. 2). However, a modification may be made in which the routine for the warning and steering prohibition control is performed between steps S220 and S230 of the lane departure prevention control.

Further, the determination of steps S340 and S360 in the first embodiment described above may be replaced with the determination of steps S340 and S360 in the second and third embodiments and the modification example, respectively.

What is claimed is:

1. A lane departure prevention device comprising:
   a camera configured to detect a position of a vehicle with respect to a lane;
   a warning device;
   a steering device including a microcomputer configured to steer a steering wheel, the microcomputer being configured to control a steering assist torque based on a steering torque; and
   an electronic control unit configured to control the warning device and the steering device, the electronic control unit being configured to perform exchange of needed information with the microcomputer in the steering device, wherein:
   the electronic control unit is configured to, when a determination is made that there is a risk that the vehicle departs from the lane based on the position of the vehicle detected by the camera, perform at least one of issuing a warning by the warning device and steering of the steering wheel, for preventing the vehicle from departing from the lane;
   the lane departure prevention device further includes a steering torque detection device configured to detect the steering torque;
   the electronic control unit is configured to, when a determination is made that the vehicle travels obliquely to the lane based on the position of the vehicle detected by the camera and a determination is made that the steering torque detected by the steering torque detection device is equal to or greater than a reference steering torque, start prohibition of issuing of the warning and prohibition of steering of the steering wheel;
   the electronic control unit is configured to acquire information on a vehicle speed, estimate a movement speed of the vehicle in a direction perpendicular to the lane based on the position of the vehicle detected by the camera and the vehicle speed, and determine whether or not the vehicle travels obliquely to the lane based on at least one of the movement speed and a temporal change rate of the movement speed; and
   the electronic control unit is configured to, when a linear sum of the movement speed and the temporal change rate of the movement speed is equal to or greater than an oblique-traveling start reference value, determine that the vehicle travels obliquely to the lane.

2. The lane departure prevention device according to claim 1, wherein the electronic control unit is configured to, in a situation where issuing of the warning and steering of the steering wheel are prohibited, when a determination is made that the vehicle terminates traveling obliquely to the lane based on the position of the vehicle detected by the camera, release the prohibition of issuing of the warning and the prohibition of steering of the steering wheel.

3. The lane departure prevention device according to claim 1, wherein the electronic control unit is configured to variably set the reference steering torque to be smaller as the vehicle speed is higher, in response to the vehicle speed.

4. The lane departure prevention device according to claim 1, wherein the electronic control unit is configured to variably set the oblique-traveling start reference value to be greater as the vehicle speed is higher, in response to the vehicle speed.

5. The lane departure prevention device according to claim 1, wherein the electronic control unit is configured to, in a situation where issuing of the warning and steering of the steering wheel are prohibited, when the linear sum of the movement speed and the temporal change rate of the movement speed is equal to or smaller than an oblique-traveling termination reference value, determine that the vehicle terminates traveling obliquely to the lane.

6. The lane departure prevention device according to claim 5, wherein the electronic control unit is configured to variably set the oblique-traveling termination reference value to be greater as the vehicle speed is higher, in response to the vehicle speed.

7. The lane departure prevention device according to claim 1, wherein the electronic control unit is configured to, in a situation where issuing of the warning and steering of the steering wheel are prohibited, when a determination is made that the vehicle travels along the lane within the lane based on the position of the vehicle detected by the camera, determine that the vehicle terminates traveling obliquely to the lane.

8. The lane departure prevention device according to claim 1, wherein:
the camera is configured to detect an obstacle in front of the vehicle; and
the electronic control unit is configured to, in a situation where issuing of the warning and steering of the steering wheel are prohibited, when the obstacle in front of the vehicle is detected by the camera, not release the prohibition of issuing of the warning and the prohibition of steering of the steering wheel even when a determination is made that the vehicle terminates traveling obliquely to the lane based on the position of the vehicle detected by the camera.

9. The lane departure prevention device according to claim 1, wherein:
the camera is configured to detect an obstacle in front of the vehicle; and
the electronic control unit is configured to, in a situation where issuing of the warning and steering of the steering wheel are prohibited, when the obstacle in front of the vehicle is detected by the camera, not release the prohibition of issuing of the warning and the prohibition of steering of the steering wheel until time equal to or longer than reference time elapses after a determination is made that the vehicle terminates traveling obliquely to the lane based on the position of the vehicle detected by the camera.

10. The lane departure prevention device according to claim 9, wherein the electronic control unit is configured to variably set the reference time to be shorter as the vehicle speed is higher, in response to the vehicle speed.

11. The lane departure prevention device according to claim 9, wherein the electronic control unit is configured to, when a determination is made that the vehicle changes the lane based on the position of the vehicle detected by the camera, release the prohibition of issuing of the warning and the prohibition of steering of the steering wheel even when the time equal to or longer than the reference time does not elapse after the determination is made that the vehicle terminates traveling obliquely to the lane.

* * * * *